June 21, 1932.  J. M. BING  1,864,180
PHOTOMETRIC CALCULATOR
Filed Aug. 9, 1929  2 Sheets-Sheet 1
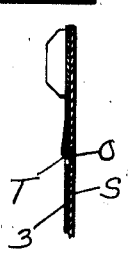
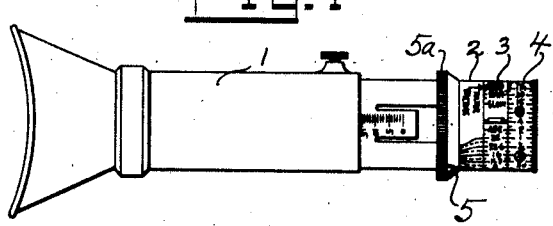
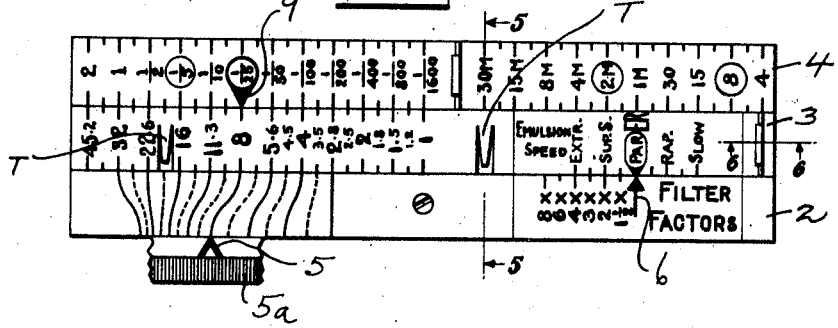
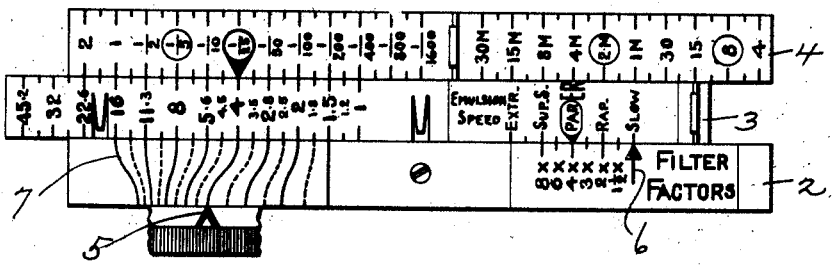
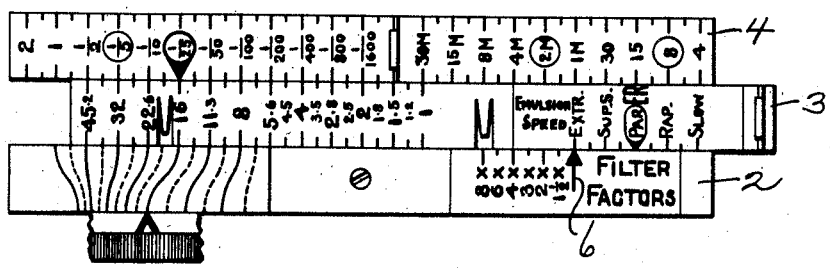
INVENTOR
Joseph M Bing
BY
ATTORNEYS June 21, 1932.  J. M. BING  1,864,180
PHOTOMETRIC CALCULATOR
Filed Aug. 9, 1929   2 Sheets-Sheet 2
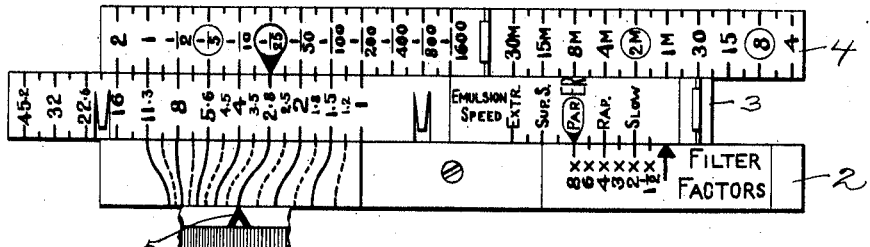
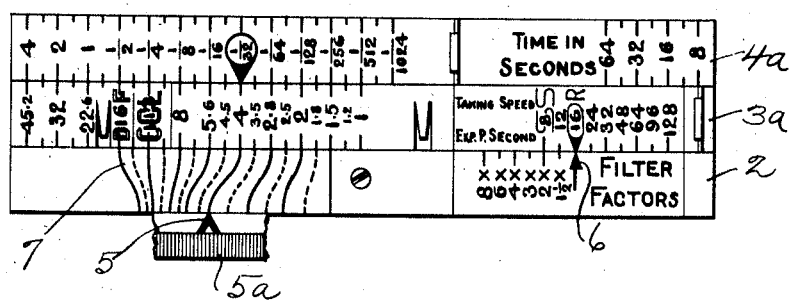
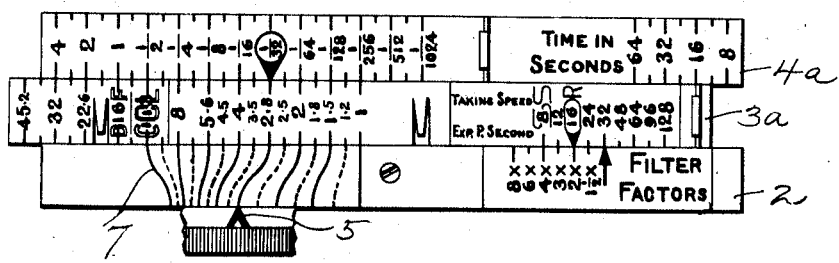
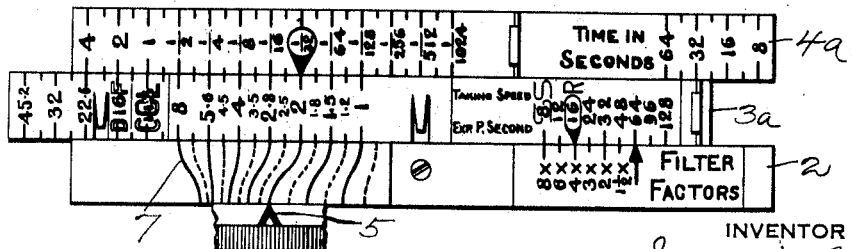
INVENTOR
Joseph M Bing
BY
Mocht Blum
ATTORNEYS Patented June 21, 1932

1,864,180

UNITED STATES PATENT OFFICE

JOSEPH M. BING, OF NEW YORK, N. Y.

PHOTOMETRIC CALCULATOR

Application filed August 9, 1929. Serial No. 384,539.

My invention relates to a new and useful improvement in a photometric calculator.

One of the objects of my invention is to provide a scale system which can be used with photometers of the type shown in Reissue U. S. Patent No. 16,879, dated February 14th, 1928, and application Ser. No. 204,180 filed July 8th, 1927, on which U. S. Patent No. 1,733,354 has been issued, although it is to be understood that my scale system may be utilized in connection with any kind of photometer, and that it can also be utilized independently of a photometer.

Another object of my invention is to provide a scale system in connection with a photometer, or independently thereof, whereby a reading will be automatically secured to make the proper adjustment of the camera so as to compensate for the use of different corrective filters or screens, the use of recording plates or films having different emulsion speeds, and other variable factors which may enter into photography.

Another object of my invention is to provide a scale system whereby direct reading can be secured of the correct lens aperture of the camera, expressed by the customary "relative stop value number" or "f number."

Another object of my invention is to provide a scale system which can be used in connection with still photography or kinematic photography.

Another object of my invention is to provide a scale system in which the respective elements may be arranged in any suitable relative position. For example, the specific embodiment later disclosed, shows the elements as arranged in concentric circles, but said elements may be arranged in the form of planar, parallel strips.

Other objects of my invention will be set forth in the following description and drawings which illustrate a preferred embodiment thereof, it being understood that the above general statement of the objects of my invention is intended merely to generally explain the same.

Fig. 1 is an elevation showing my invention applied to a photometer of the type shown in Reissue U. S. Patent No. 16,879 and application Ser. No. 204,180.

Fig. 2 is a diagrammatic view showing the scale system as utilized in still photography, and applied to a photometer of the "extinction" type as shown in said Reissue U. S. Patent No. 16,879 and application Ser. No. 204,180. In this embodiment the correct exposure condition is indicated by the position of an index on the iris collar of the photometer. The system may apply to photography without the use of filters, and with the use of a photographic film of "par" speed, or "extra rapid" film of the usual kind.

Fig. 3 shows the same system applied to still photography, and showing the use of a filter.

Fig. 4 shows the same system applied to still photography, and showing the use of a photographic plate or film which is much faster than the "par" type previously mentioned.

Figs. 5 and 6 diagrammatically illustrate certain mechanical details.

Fig. 7 shows the system as utilized in connection with still photography in which allowance is made for the combined use of a filter, and a change in the speed of the film or plate used in the camera.

Figs. 8, 9 and 10 show the use of the system previously mentioned, as applied to kinematic or motion picture photography.

As shown in Fig. 1, the photometer 1 may be of any suitable type, as for example, the type shown in Reissue U. S. Patent No. 16,879 and application Ser. No. 204,180. This type of instrument is provided with an iris diaphragm and with a field or fields of varying permeability, through which the light is allowed to shine. The iris diaphragm of the instrument is manipulated until the proper field is no longer visible, and the setting of the iris diaphragm of the instrument then indicates the setting of the iris diaphragm of the camera, in accordance with the light conditions present.

According to this invention the photometer is provided with scales 2, 3 and 4 which consist of concentric collars. The use of these three scales makes it possible to secure direct reading for the various combinations of filter factors, emulsion speed, and lens aperture. The variation in filter factors is due to the various corrective filters or screens used in front of the camera lens, to either diminish the light admitted into the camera, or to filter out certain portions of the light, so as to only admit light having a certain color or wave length. The variation in emulsion speed depends upon the inherent speed of the sensitized photographic material, which determines the specific time during which light should act upon the photographic emulsion to produce the proper deposit of metallic silver or the like, when the plate or film is developed. The lens aperture or "f number" limits the amount of light admitted into the camera and this is usually regulated by an iris diaphragm, which is one type of variable masking contrivance.

These three principal factors which enter into the photographic conditions can be separately or jointly considered, to provide a direct reading by a single movement of one of the scale elements, namely, the scale element which brings the "f number" into such alignment and position that an indicator shows the correct "f number" for the iris diaphragm of the camera lens, which preferably has a similar scale.

For example, in Fig. 2, the three rings 2, 3 and 4 are shown as being developed into planar form. Assuming that the plate employed has "par" speed, which is sometimes designated as "extra rapid", the second or intermediate ring 3 is manipulated until the designation "par" is in alignment with the arrow index 6 on the first ring 2. The index 5 which showed the setting of the iris diaphragm of the photometer then points to the stop number "f: 8".

This corresponds to normal exposure for photometers of the type above mentioned, because their normal reading corresponds to the use of "par" speed film utilized without a filter. The aperture control of this type of instrument is by means of an iris diaphragm or a spiral split. If controlled by an iris, then the reading of the scale indicates the relative stop values, in the customary "f" system which is a geometric progression in which adjacent stop numbers indicate one half or double time. Hence, the distances between the various stop numbers would not be equal, but these unequally spaced numbers of the index are converted into a scale of equal parts by the guide lines 7.

A scale indicating the various filter factors is also located upon the fixed first ring 2, which carries the guide lines 7. The spaces between the indications of the various filter factors are the same and have the same relative relation as that between successive guide lines 7. The large numbers on the scale indicated as "Filter factors", indicate filters of greater density and of smaller light permeability. Hence, the aperture of the lens must increase in proportion to the density of the filter so that the stop number must decrease, as the density of the filter is increased, because a smaller stop number indicates a greater lens aperture.

The adjustment of the scale system is effected by shifting the second or intermediate ring 3 in the clockwise direction.

For example, if a "4-time" filter is to be utilized, the intermediate ring 3 is shifted, as shown in Fig. 3, until the designation "par" is in alignment with the designation "4x" on the scale of filter factors. This causes the scale of stop numbers to be shifted by two numbers so that the guide line 7, which now registers with the index 5, points to the number "4" on the scale of stop numbers, instead of pointing to the number "8" which is the condition indicated in Fig. 2. Hence, if the diaphragm or other means for regulating the aperture of the camera lens is correspondingly adjusted, four times as much light is caused to act upon the sensitized plate or film, so as to compensate for the employment of the "4x" filter.

As shown in Fig. 4, the scale system may be adjusted to show the compensation required for photographic emulsions of different speeds. For example, in Fig. 4, the intermediate ring 3 has been adjusted so that the index 6 points to the designation "Extr", which corresponds to an emulsion of "extreme" speed, which is four times faster than "par" speed. As shown in Fig. 4, since the designation "Extr" is now in alignment with index 6, the scale of stop numbers is also automatically shifted to the right, or in the clockwise direction, so that the index 5 now points to the stop number 16. This corresponds to a smaller lens aperture so as to compensate for the use of the faster emulsion. The stop "f:16" corresponds to one-fourth of the light admitted by the former stop "f:8" used with a "par" speed emulsion.

As shown in Fig. 7, a combination of variations in the use of filter and emulsion can be taken care of by the system. For example, Fig. 7 illustrates the use of a "slow" emulsion which requires four times the exposure of "par" emulsion. Likewise, a "2-time" filter is to be utilized. The intermediate ring 3 is therefore shifted until the designation "Slow" registers with the designation "2x" on the ring 2. This causes the original or normal stop number "8" to be shifted for a distance corresponding to three whole stops so that the index 5 now points to the stop number "2.8" which causes eight times as much light to be admitted to the lens, so as to compensate for a plate or film which is four times slower, and to also compensate for the use of the filter.

The third or time ring 4 can be manipulated so as to allow for variation of the exposure time or shutter speed. For example, the normal conditions shown in Fig. 2 may correspond for example, to 1/25 of a second exposure time.

As shown in Fig. 2, this designation on the time ring 4 is provided with an index 9 which registers with the stop number "8" upon the scale of stop values.

The relation of the scale indications on the ring 4 with the scale of relative stop values permits the proper stop value to be immediately selected, in accordance with variation in exposure time. For example, in Fig. 3 it has been previously assumed that the exposure time is retained at 1/25 of a second. If for example, an exposure time of 1/50 of a second is selected, then the proper stop value would be "2.8" instead of the stop value "4" indicated by the index 5 and the corresponding guide line 7. The adjustment of the diaphragm associated with the camera lens, corresponding to the stop value "2.8" would increase the amount of light available for the exposure, so as to make proper allowance for the decrease in exposure time. It is to be understood that the scale system previously discussed, is for use in still photography, and that the embodiment shown in Figs. 8–10 is to be used for kinematic photography. In kinematic photography the scale 2 is the same as before, but the ring 3 is replaced by a ring 3a having a scale which indicates the exposures per second. The ring 4 is replaced by a ring 4a having a different scale.

In most motion picture cameras, filters are employed which act like the filters previously mentioned. This scale is indicated upon the first or fixed ring 2, which remains fixed as in the system utilized in connection with still photography. The scale illustrated is that used in connection with the photometer shown in said Reissue U. S. Patent No. 16,879 and application Ser. No. 204,180, but the scale could be varied in accordance with the type of photometer or exposure meter utilized. Likewise, the tables and charts now used independently of photometers or exposure meters, or actinometers could also have this automatic scale system incorporated therein.

In order to allow for the use of filters, the movable stop numbers shown on the ring 3a must be shifted to the left so as to cause smaller stop numbers to be used in accordance with the increasing density of the filter employed.

Motion pictures are ordinarily taken at a so-called normal frequency of sixteen per second, and they are normally projected at the same rate. However, other speeds may be utilized. For example, the speed may be as low as eight frames per second, so as to produce accelerated motion when the pictures are projected at a normal frequency of sixteen per second. Likewise, the pictures may be taken at a rate which is a multiple of the normal frequency (such as 32, 48, 64 frames per second), so as to produce a slow-motion effect when the film is projected at the normal frequency of sixteen per second. If the number of exposures per second is decreased, the frame is subjected to the action of light for a longer period, so that a smaller lens aperture should be utilized. On the contrary, if the number of exposures per second is increased, then each frame or picture will have a shorter exposure time, and more light must be admitted which corresponds to a smaller stop number. Hence, the second or intermediate ring is moved to the right to allow for the decrease in the number of frames taken per second, so as to bring a larger stop number in registration with the index 5 through the corresponding guide line 7. If the number of frames taken per second is increased, the intermediate ring 3a is moved to the left, or in the counterclockwise direction, thus causing a smaller stop number, which corresponds to a larger lens aperture, to register with the index 5 through the corresponding guide line 7. It is to be understood that the index 5 is connected to the ring 5a which controls the adjustment of the iris diaphragm of the photometer, in the particular embodiment described.

For example, Fig. 8 corresponds to a normal taking speed of sixteen exposures per second, and without the use of a filter. Hence, the designation "16" on the scale of the ring 3a is caused to register with the index arrow 6, and the guide line 7 which registers with the index mark 5, therefore points to the stop number "4".

Fig. 9 shows the change in conditions if a "2-time" filter is employed. The intermediate ring 3a is shifted until the said designation "16" is in alignment with the designation "2x" on the first or fixed ring 2. The guide line 7 which is now in alignment with the index mark 5, points to the stop number "2.8", so that double the amount of light is admitted into the camera, to compensate for the loss of light resulting from the employment of the filter.

If the pictures are being taken at the rate of 32 frames per second, instead of the normal frequency of 16 frames per second, then each individual frame or picture only has one-half the exposure time. Under such conditions, the designation "32" on the intermediate ring 3a can be shifted to be in alignment with the index arrow 6 on the fixed ring 2, which will cause the guide line 7 which is in alignment with the index mark 5, to again point to the stop number "2.8".

Fig. 10 shows the use of the system if the filter factor and the speed factor are jointly varied. For example, Fig. 10 shows the condition corresponding to the employment of a "2x" filter, and a taking speed of "32" exposures per second. The mark 32 on ring 3a is therefore brought into alignment with the designation "2x" on the fixed ring 2, so that the guide line 7 which is in alignment with the index 5 thereupon points to the stop number 2, which corresponds to the admission of four times as much light as the original stop number "8".

The system is also designed so as to make special allowance for the "Kodacolor" system of pictures which employs a color filter, which is approximately "30x". This requires a lens aperture corresponding to "f:2". In view of the employment of a filter having the value above mentioned in the "Kodacolor" process, the amount of light which ultimately reaches the film has the effective value of the stop number "11.3", because the exposure time corresponding to the relative stop values varies according to the squares of the stop numbers.

Hence, "Kodacolor" pictures can be secured only under such conditions that the exposure on regular black and white film would require a stop value of approximately "11.3", namely, if the illumination used would require such a stop value.

As shown in Figs. 8–10, the portion of the stop scale adjacent the designation "11.3" is distinctively marked, as for example, by coloring the same, this color being indicated by the designation "Col". By thus designating this portion of the stop scale, by causing it to contrast with the remainder thereof, this portion of the stop scale can be immediately observed on determining normal exposure with the type of photometer or exposure meter before mentioned, or with other types of exposure meters, or with tables or slide rules, or actinometers, of the wedge or extinction or re-appearance type.

For example, in Fig. 8 the index 5 points to the stop number "4". This is to the right of what may be designated as "Kodacolor field", and "Kodacolor" photography would not be successful because the film would be very much underexposed. If however, the guide line 7 which is in alignment with the index 5 would point to a stop number of approximately "11.3", then the "Kodacolor" film can be exposed.

If the light is particularly good so that a stop as small as "f:16" would be utilized in ordinary motion picture photography, a so-called neutral density filter is introduced into the "Kodacolor" process, in order to prevent over-exposure.

As shown in Figs. 8, 9 and 10, this would correspond to that portion of the scale on the intermediate ring 3a, which is to the left of the "Kodacolor" section, this portion of the scale being indicated by "DF". If the guide line 7 which is in alignment with the index 5 points to the portion of the scale corresponding to the designation "DF", then the photographer is immediately warned to use the "neutral density filter."

The above explanation is based on the assumption that the normal taking speed of "16" exposures per second is utilized. However, the scale system will automatically supply the proper information for the use of the "Kodacolor" at any taking speed.

For example, if the speed is reduced to "8" exposures per second, then the designation "8" on the ring 3a is shifted from the position indicated in Fig. 8 until it is in alignment with the index arrow 6 on the fixed ring 2. This would cause the scale of stop numbers to be shifted by a scale unit, so that the "Kodacolor field", together with the designation "11.3" assumes the position formerly occupied by the designation "8". This will show that "Kodacolor" work is possible when the light is such that the guide line 7 which is in registration with the index 5, points to the "Kodacolor field" in its new position. The slower speed of taking and the consequent longer time of exposure of each "Kodacolor" picture or frame, permits the use of less brilliant illumination, namely, such illumination as would ordinarily have required a lens aperture corresponding to the stop number "8". This is directly and instantly shown by the improved scale system.

When the color indicator field is thus moved, the corresponding designation for the neutral density filter is also correspondingly shifted, so that this indication is likewise direct and automatic. The third or time ring 4a is utilized like the time ring referred to in the first embodiment, in connection with still photography. The basic time corresponding to normal exposure is adapted as the basis for this system. For example, if the frames are being taken at normal frequency, and the shutter employed in the motion picture camera has the usual open sector angle of 180°, and the normal exposure time for each frame is 1/32 of a second, then the indication corresponding to this, as shown in Fig. 8, is caused to align with the stop number "4".

Referring to the scale indicated on ring 3a, at the right hand side of Figs. 8, 9 and 10, the designation "S S" appears directly adjacent the number "8", indicating "super speed" emulsion. Likewise, the designation "R" appears adjacent the number "16" to designate "regular" speed film. By shifting the ring 3a so that the designation "S S" is adjacent the arrow 6, the stop numbers will be shifted to cause the selection of smaller lens apertures, thus making an allowance for the faster film, if the same is used. Instead of indicating the time on the third ring 4a, a corresponding scale could be utilized having figures representing the openings of the shutter sectors in rotary shutters, because said openings may be variable at the option of the operator, and said openings are thus variable in most cameras used for professional work.

Thus, the designation "1/32" could be replaced by the designation "180°" as this corresponds to an exposure time of 1/32 of a second if the frames are taken at normal frequency.

Likewise, the smaller and larger angles of shutter openings could be transformed into resulting time, the smaller angles being indicated at the right and the larger angles being indicated at the left of the designation "180°". Hence, the proper stop number could be selected for any angle which was being utilized, while properly correlating the filter factors and the taking speed.

In connection with the previous explanation, it has been assumed that the scale rings have been shifted before the exposure meter is utilized to take the necessary reading. However, the scale system will operate in exactly the same manner and just as ready to automatically determine the proper lens aperture, if normal exposure has been preliminarily determined. If it is then determined to use filters, or to make any changes in conditions present, the system can be utilized to re-establish or change the proper lens aperture. Likewise, the information provided by the scale system, remains permanent until it is changed by the operator, so that it is not necessary to memorize the reading after setting the exposure meter and before setting the camera.

In order to mechanically align the scale markings, the second ring 3 may be provided with a pair of tongues or projections T, as shown in Fig. 5. Each of these tongues T are provided by suitably stamping the said ring 3 so as to render said tongues T resilient. The tongues T fit into recesses in the support S, and the tongues are so arranged that when one of them enters one of said recesses, so that one of the guide lines 7 registers with the index 5, the other of said tongues T is intermediate two of said recesses. As shown in Fig. 5, said tongues T can slide in a groove provided in a carrier S, said grooves being provided with spaced openings so that said tongues T serve to retain the ring 3 upon the carrier, while permitting a proper turning movement thereof. Hence, when the ring 3 is turned for a distance corresponding to half the distance between the ends of adjacent lines 7, a slight but definite resistance is offered to the further turning of the ring 3. Due to the resilience of the tongues T, they snap into and out of the openings in the carrier S, as the ring 3 is turned. Likewise, when the ring 3 is moved to the designated position, the tongues T hold it in said position because the tip of one of said tongues has then entered the corresponding opening O.

As shown in Fig. 6, the ring 3 may be provided with a projection P in order to more readily manipulate the same.

If desired, the rings 4 and 4a could be constructed like the rings 3 and 3a, in order to enable the same to be shifted.

It will be noted that the outer ends of the guide lines 7, that is, those ends which are directly adjacent the scale of stop values, are equally spaced. On the contrary, the inner ends are unequally spaced, so that the collar 5a, which controls the adjustment of the iris diaphragm or similar control device of the photometer shown in Fig. 1, can be moved in the ordinary manner for normal reading.

While I have described the ring or scale member 2 as being fixed, the ring or scale members 3 and 3a being movable, the important factor is the relative movement between the various scale members illustrated, and my invention covers all devices having the necessary relative movement or movements.

The various scales other than the scale of stop numbers, may for convenience be described as scales of "photographic conditions", since each of them indicates one of the conditions which affects the proper stop value to be utilized for taking the exposure.

While I have referred to certain definite scales in the claims, it is to be understood that the invention is not to be limited to the specific scales illustrated herein, as such scales merely serve to illustrate the various uses of the improved device.

I have shown a complete combination or system describing the best embodiments of my invention, but it is obvious that certain sub-combinations or portions or said system could be independently utilized, so that the invention is not to be restricted to the complete combination described herein.

I have shown preferred embodiments of my invention, but it is clear that numerous changes and omissions could be made without departing from its spirit.

I claim:

1. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale.

2. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale, said third relatively movable member being adapted to be set in accordance with light conditions present, said second member having a series of lines connecting the indications of said first scale substantially to the outer edge of said third member, so that said lines directly cooperate with the index of the third member, the outer ends of said lines being unequally spaced to correspond with the movement of said third member in accordance with varying light conditions.

3. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale, said second member also having a scale of filter factors thereon adjacent said second scale, said scales being correspondingly graduated to cooperate with each other.

4. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale, and a fourth member having a scale indicating exposure times, said scale of exposure times being adjacent to and being correspondingly graduated to the scale of exposure stop values.

5. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale, said third movable member being adapted to be set in accordance with light conditions present, said second member having a series of lines connecting the indications of said first scale substantially to the outer edge of said third member, so that said lines directly cooperate with the index of the third member, the outer ends of said lines being unequally spaced to correspond with the movement of said third member in accordance with varying light conditions, and a fourth member having a scale indicating exposure times, said scale of exposure times being adjacent to and being correspondingly graduated to the scale of stop values.

6. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale, and a fourth member having an additional scale of the number of exposures per second, said additional scale being adjacent to and being correspondingly graduated to the scale of stop values.

7. A scale device for an exposure meter comprising a first movable member, said member having thereon a first scale indicating stop values and a second scale indicating plate emulsion speeds, said scales being spaced from each other, a second member, said second member having an index adjacent to and cooperating with said second scale, and a third member movable with respect to both the other members and having an index adapted to cooperate with said first scale, and a fourth member having an additional scale of the number of exposures per second, said additional scale being adjacent to and being correspondingly graduated to the scale of stop values, a portion of the scale of stop values being specially indicated for color kinematography.

In testimony whereof I affix my signature.

JOSEPH M. BING.